US012754949B2

(12) United States Patent
Jiang et al.

(10) Patent No.: US 12,754,949 B2
(45) Date of Patent: Oct. 6, 2026

(54) METHOD FOR EDITING AND PROCESSING MULTIMEDIA MATERIAL, ELECTRONIC DEVICE AND STORAGE MEDIUM

(71) Applicant: Beijing Zitiao Network Technology Co., Ltd., Beijing (CN)

(72) Inventors: Qi Jiang, Beijing (CN); Chengcai Gao, Beijing (CN); Xiaoling Fu, Beijing (CN); Junjie Liu, Beijing (CN); Hai He, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 19/253,638

(22) Filed: Jun. 27, 2025

(65) Prior Publication Data

US 2026/0080004 A1 Mar. 19, 2026

(30) Foreign Application Priority Data

Sep. 19, 2024 (CN) ........................ 202411311898.4

(51) Int. Cl.
*G06F 16/00* (2019.01)
*G06F 16/41* (2019.01)
*G06T 11/60* (2006.01)
*G11B 27/031* (2006.01)

(52) U.S. Cl.
CPC ............. *G06F 16/41* (2019.01); *G06T 11/60* (2013.01); *G11B 27/031* (2013.01)

(58) Field of Classification Search
None
See application file for complete search history.

(56) References Cited

U.S. PATENT DOCUMENTS

| | | | | |
|---|---|---|---|---|
| 8,102,986 | B1 * | 1/2012 | McClintock | H04M 1/72436 370/352 |
| 8,621,382 | B1 * | 12/2013 | Young | G06F 3/0482 715/764 |
| 9,058,635 | B1 * | 6/2015 | Rybkin | G16H 10/60 |
| 2004/0009813 | A1 * | 1/2004 | Wind | A63F 13/63 463/30 |
| 2005/0102329 | A1 * | 5/2005 | Jiang | G06F 11/1451 |
| 2005/0160065 | A1 * | 7/2005 | Seeman | G06F 16/957 |
| 2005/0289524 | A1 * | 12/2005 | McGinnes | G06Q 10/10 717/140 |
| 2020/0387567 | A1 * | 12/2020 | Loforte | G06F 16/93 |
| 2023/0412855 | A1 * | 12/2023 | Heckman | G06F 11/07 |

(Continued)

FOREIGN PATENT DOCUMENTS

| | | | | |
|---|---|---|---|---|
| CN | 109963205 A | * | 7/2019 | H04N 21/485 |
| CN | 111126032 A | * | 5/2020 | G06V 10/22 |

(Continued)

*Primary Examiner* — Hasanul Mobin
(74) *Attorney, Agent, or Firm* — Astute IP Law Group

(57) ABSTRACT

Embodiments of the present disclosure provides a method for editing and processing multimedia material, an electronic device and a storage medium. And the method includes: determining first editing task information associated with a first editing state; determining second editing task information associated with a second editing state; and performing draft storage on the second editing state of the editing task when the draft storage is triggered for the target editing task in the second editing state.

18 Claims, 4 Drawing Sheets

(56) References Cited

U.S. PATENT DOCUMENTS

| | | | | |
|---|---|---|---|---|
| 2024/0127863 | A1* | 4/2024 | Huang | G11B 27/036 |
| 2024/0170025 | A1* | 5/2024 | Wang | G11B 27/036 |
| 2024/0220063 | A1* | 7/2024 | Sutrave | G06F 3/0481 |
| 2024/0331734 | A1* | 10/2024 | Zhang | G11B 27/036 |
| 2024/0355024 | A1* | 10/2024 | Tang | G06T 11/60 |
| 2024/0404560 | A1* | 12/2024 | He | G09B 5/065 |
| 2025/0239275 | A1* | 7/2025 | Yin | G11B 27/005 |
| 2026/0080903 | A1* | 3/2026 | Jiang | G11B 27/031 |

FOREIGN PATENT DOCUMENTS

| | | | | |
|---|---|---|---|---|
| CN | 111309228 A | * | 6/2020 | G06F 16/48 |
| EP | 4597496 A2 | * | 8/2025 | G11B 27/036 |

* cited by examiner

METHOD FOR EDITING AND PROCESSING MULTIMEDIA MATERIAL, ELECTRONIC DEVICE AND STORAGE MEDIUM

CROSS-REFERENCE TO RELATED APPLICATION

The present application claims priority to Chinese Patent Application No. 202411311898.4, filed on Sep. 19, 2024, which is incorporated herein by reference in its entirety as a part of the present application.

TECHNICAL FIELD

Embodiments of the present disclosure relates to a method for editing and processing multimedia material, an electronic device and a storage medium.

BACKGROUND

In today's multimedia era, the editing of multimedia materials is becoming more and more important and common. In a process of editing the multimedia materials, it is often necessary to temporarily interrupt editing. Through a draft function, an editing state of the multimedia material can be temporarily stored, so that drafts can be restored and edited in subsequent time.

However, with the continuous development and diversification of multimedia material editing, the draft function has also exposed some problems. For example, with the increasing abundance of editing modes, draft data becomes more and more diverse. Every time a draft is temporarily stored, a large amount of editing state attribute information needs to be permanently stored locally, which will not only slow down the speed of saving the draft, but also make a process of restoring the draft to continue editing more complicated and time-consuming, seriously affecting the fluency and efficiency of multimedia material editing.

SUMMARY

Embodiments of the present disclosure provides a method for editing and processing multimedia material, and an apparatus for editing and processing multimedia material, an electronic device and a storage medium.

Embodiments of the present disclosure provides a method for editing and processing multimedia material, and the method includes: determining first editing task information associated with a first editing state, where the first editing state is an initial editing state where a target editing task is initially triggered, the first editing task information is used for describing an editing result generated by a triggered editing operation in the editing state for the target editing task, and the target editing task is a multimedia material editing task; determining second editing task information associated with a second editing state, where the second editing state is an editing state where editing operation continued to be triggered for the target editing task already in the first editing state; and performing draft storage on the second editing state of the target editing task when the draft storage is triggered for the target editing task in the second editing state, where the draft storage for the second editing state of the target editing task is determined based on an editing task information difference between the second editing task information and the first editing task information.

Embodiments of the present disclosure provides an apparatus for editing and processing multimedia material, and the apparatus includes: a first determination module, a second determination module and a storage processing module.

The first determination module configured to determine first editing task information associated with a first editing state, where the first editing state is an initial editing state where a target editing task is initially triggered, the first editing task information is used for describing an editing result generated by a triggered editing operation in the editing state for the target editing task, and the target editing task is a multimedia material editing task.

The second determination module configured to determine second editing task information associated with a second editing state, where the second editing state is an editing state where editing operation continued to be triggered for the target editing task already in the first editing state.

The storage processing module configured to perform draft storage on the second editing state of the target editing task when the draft storage is triggered for the target editing task in the second editing state, where the draft when the target editing task is in the second editing stat is determined based on an editing task information difference between the second editing task information and the first editing task information.

Embodiments of the present disclosure provides an electronic device, and the electronic device includes: one or more processors and a memory.

The memory configured to store one or more programs, where the one or more programs, when executed by the one or more processors, cause the one or more processors to implement the method for editing and processing multimedia material described in any embodiment of the present disclosure.

Embodiments of the present disclosure provides a storage medium including computer-executable instructions, where the computer-executable instructions, when executed by a computer processor, are used for executing the method for editing and processing multimedia material described in any embodiment of the present disclosure.

It should be understood that the content described in this section is not intended to identify key or important features of the embodiments of the present disclosure, nor is it intended to limit the scope of the present disclosure. Other features of the present disclosure will be readily understood from the following description.

BRIEF DESCRIPTION OF DRAWINGS

The above and other features, advantages and aspects of embodiments of the present disclosure are become more apparent by referring to the following detailed description when taken in conjunction with the accompanying drawings. Throughout the drawings, the same or similar reference numerals indicate the same or similar elements. It should be understood that the drawings are schematic, and the original and elements are not necessarily drawn to scale.

DETAILED DESCRIPTION

Figure 1:
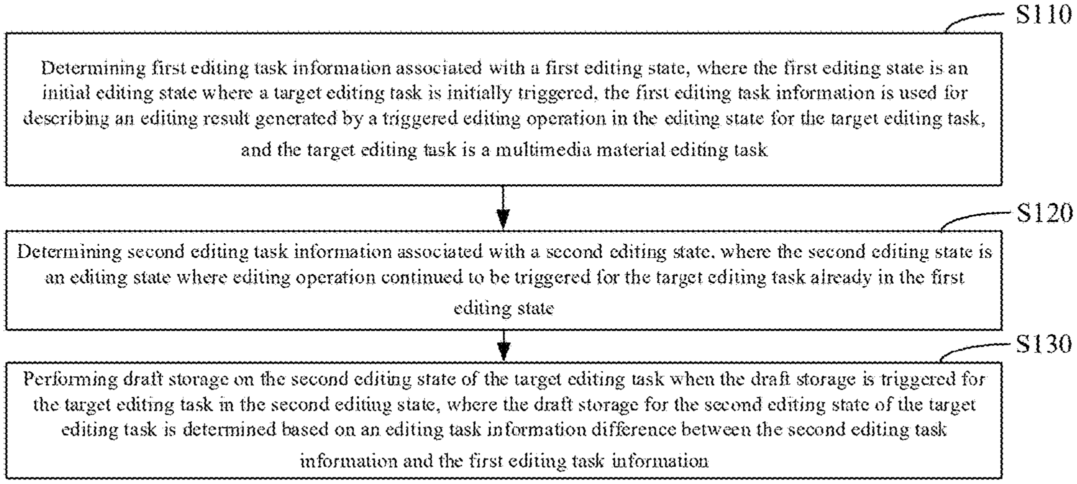
FIG. 1 is a flow diagram of a method for editing and processing multimedia material provided by an embodiment of the present disclosure.

The embodiments of the present disclosure are described in more detail below with reference to the accompanying drawings. Although certain embodiments of the present disclosure are shown in the drawings, it should be understood that the present disclosure may be implemented in various forms and should not be construed as limited to the embodiments set forth herein. On the contrary, these embodiments are provided to enable a more thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be executed in different orders and/or in parallel. Additionally, the method embodiments may include additional steps and/or omit executing the shown steps. The scope of the present disclosure is not limited in this respect.

As used herein, the term “include” and its variations are open-ended inclusions, i.e., “including but not limited to”. The term “based on” means “at least partially based on”. The term “one embodiment” means “at least one embodiment”; the term “another embodiment” means “at least one additional embodiment”; the term “some embodiments” means “at least some embodiments”. Relevant definitions of other terms will be given in the following description.

It should be noted that the concepts of “first”, “second”, etc. mentioned in the present disclosure are only used to distinguish different devices, modules, or units, and are not used to limit the order of functions performed by these devices, modules, or units or their interdependencies.

It should be noted that the qualifiers “one” and “multiple” mentioned in the present disclosure are illustrative rather than restrictive. Those skilled in the art should understand that unless explicitly stated otherwise in the context, they should be interpreted as “one or more”.

The names of messages or information exchanged between apparatuses in the embodiments of the present disclosure are for illustrative purposes only, and are not intended to limit the scope of the messages or information.

FIG. 1 is a flow diagram of a method for editing and processing multimedia material provided by an embodiment of the present disclosure. The embodiment of the present disclosure is suitable for saving drafts in a process of editing multimedia materials. The method for editing and processing multimedia material can be executed by an apparatus for editing and processing multimedia material. The apparatus for editing and processing multimedia material can be implemented in a form of software and/or hardware, and is generally integrated on any electronic device with a network communication function, which may be a mobile terminal, a PC or a server.

As shown in FIG. 1, the method for editing and processing multimedia material of the embodiment of the present disclosure may include the following steps:

S110: determining first editing task information associated with a first editing state, where the first editing state is an initial editing state where a target editing task is initially triggered, the first editing task information is used for describing an editing result generated by a triggered editing operation in the editing state for the target editing task, and the target editing task is a multimedia material editing task.

Figure 2:
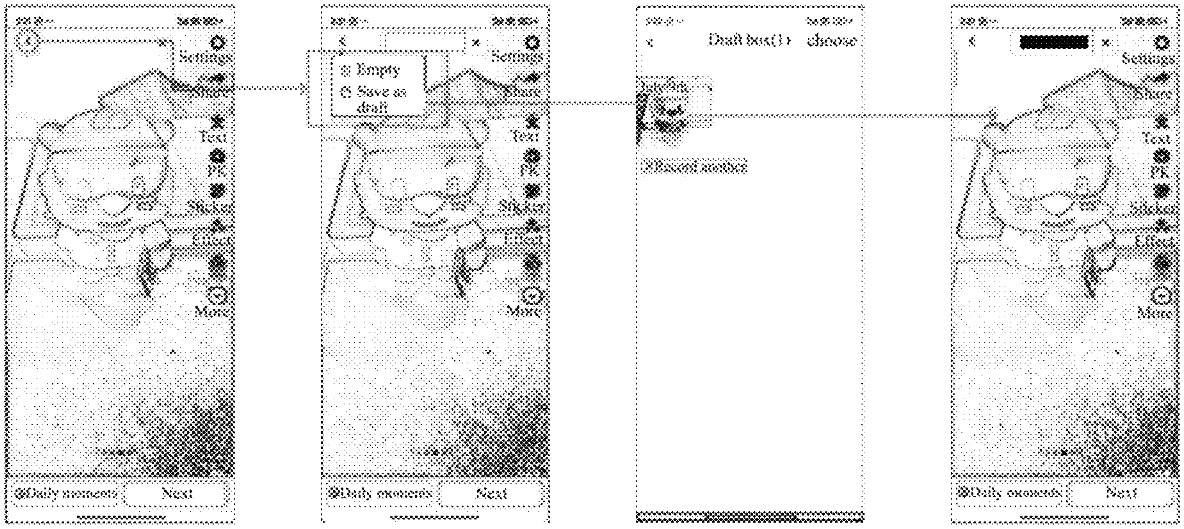
FIG. 2 is a schematic diagram of pages for performing draft storage on multimedia materials provided by an embodiment of the present disclosure.

As shown in FIG. 2, in a process of editing a multimedia material, there is provided a draft function. Through this draft function, the editing state of the multimedia material when edited can be temporarily stored, so that the editing operation can be continued when entering the editing state next time. A use mode of the draft includes editing the multimedia material, suspending the editing of the multimedia material, temporarily storing the editing state of the multimedia material as a draft, and restoring the draft to continue editing the multimedia material. When the above-mentioned drafts are temporarily stored, it is usually understood that editing task information data of each editing state in a memory is locally persisted and stored in a disk for storage.

The editing state may refer to an editing state in which an editing page corresponding to the target editing task is located after a series of editing operations are performed in an execution process of the target editing task. Optionally, the target editing task is a multimedia material editing task, which covers editing operations on various types of multimedia materials such as images, audios and videos. Accordingly, the editing state can characterize an editing result produced by editing operations such as a specific multimedia material combination, effect application and a duration on the target editing task after the editing operations are performed on the multimedia material. For example, by taking the multimedia material as a video material as an example, in video material editing, the editing state may be a state in which the editing page corresponding to the multimedia material editing task is located after specific filters, subtitles and music has been added and the video material has been edited and spliced to a certain extent.

Optionally, the multimedia material editing task may process and modify the multimedia material to achieve an editing task with an expected editing effect. For example, multimedia materials may refer to various original materials used to compose multimedia works, and the multimedia materials may include at least one of video materials, audio materials, image materials, etc. For example, editing tasks such as editing, adding effects, and making subtitles are performed on multimedia content such as videos, audios, and images.

The first editing state may refer to a corresponding initial editing state when the target editing task has just been triggered to jump to the editing page corresponding to the target editing task. At this time, this first editing state can be understood as a starting editing state when a user enters the editing page corresponding to the target editing task for the first time or resumes entering the editing page corresponding to the target editing task again.

For the target editing task in the first editing state, the first editing task information is used for describing the editing result of the target editing task in the first editing state due to the editing operation triggered for the target editing task. For example, video editing may include an initial video duration, a resolution and other information, as well as records of some simple clipping operations that may have been carried out. The first editing task information can support the independent display of an editing effect caused by the triggered editing operation in the editing state to which the first editing task information belongs, which means that when the editing result corresponding to the target editing task in the first editing state needs to be displayed, the corresponding editing result can be completely presented by directly using the first editing task information.

Optionally, for the target editing task, the editing operation involved in the editing task information may refer to various editing actions in a process of editing multimedia materials involved in the target editing task, such as cropping, adding filters, adjusting the volume, etc. The editing result can be an actual editing effect produced by the editing operation on the target editing task, such as a cropped video picture, an image color after the filter is applied, etc.

The target editing task is a multimedia material editing task, and it is clear that the target editing task can be various editing tasks related to multimedia materials such as image editing, video editing and audio processing. Optionally, when the target editing task is triggered, the target editing task in the first editing state is accurately identified; for example, in image editing software, jumping to an editing page at the moment of importing a picture means entering the first editing state. When the target editing task is in the first editing state, the editing result generated by the editing operation triggered for the target editing task in the target editing task can be recorded, and the editing result of the target editing task can be stored as the first editing task information in a preset format. For example, when it is video editing, some simple play preview operations are performed in the first editing state, and information such as time points and play progresses of these editing operations can be used as part of the first editing task information.

By adopting the above mode, the editing result of the target editing task in the first editing state can be accurately described through the first editing task information, and the progress of the target editing task at a current moment can be clearly understood. And, with the progress of the editing task, the first editing task information can be used as the basis for subsequent editing, so that the editing state can be compared with and the first editing state conveniently.

As an optional but non-limiting implementation, the determining first editing task information associated with a first editing state includes the following steps A1-A2:

Step A1: loading a target editing template selected for the target editing task to generate the target editing task in the first editing state when an execution editing operation creating the target editing task is triggered.

Step A2: recording the first editing task information associated with the target editing task in the first editing state.

The first editing state may be an initial editing state generated by loading the target editing template corresponding to the target editing task when the execution editing operation creating the target editing task is triggered. The target editing template may be a preset template with a specific structure and style for loading and generating an editing task to perform an editing operation, and can be used for quickly starting the editing task and providing an initial framework for editing. The first editing task information can be used for describing editing result information of the target editing task in the first editing state after the target editing template selected by the target editing task is loaded, such as an initial page layout and a preset format of the editing page corresponding to the target editing task formed after the target editing template is loaded.

Optionally, execution editing operation creating the target editing task is triggered may be understood as triggering the creation of the target editing task by a preset triggering mode (such as clicking an editing button, selecting a multimedia material for import, etc.) when it is decided to start a multimedia material editing task. Optionally, in response to a target editing template selected for a target editing task from a plurality of available editing templates, template data associated with the target editing template selected for the target editing task is read and loaded to generate an editing page corresponding to the target editing task in the first editing state. The target editing template may contain preset elements such as a specific layout, a color scheme and a font style. For example, in video editing, selecting a movie-style template may load a specific picture scale, a subtitle style and a transition effect.

After the first editing state is generated by loading the target editing template, first editing task information of the target editing task in the first editing state is started to be recorded. At this time, the first editing task information may include specific features of the editing template, initial settings after loading and editing results involved in any minor adjustment in the initial state. For example, when color parameters are adjusted immediately after the editing template is loaded, this color parameter adjustment will also be recorded as part of the first editing task information.

By adopting the above mode, by providing the target editing template, the editing state can be quickly entered, and there is no need to build an editing task from a completely blank editing state, so that the time and energy are saved greatly and the editing efficiency of the target editing task is improved; moreover, by recording the task information of the first editing state, reference can be provided for subsequent editing and modification, and editing task information differences of different editing states can be compared conveniently.

As another optional but non-limiting implementation, the determining first editing task information associated with a first editing state includes the following steps B1-B2:

Step B1: loading a reference draft selected for the target editing task to generate the target editing task in the first editing state when an execution editing operation restoring from a draft to an editing task corresponding to the draft is triggered, where the reference draft is a draft enabling the target editing task to enter the first editing state, selected from stored draft information.

Step B2: recording first editing task information associated with the target editing task in the first editing state.

The first editing state may be an initial editing state when restoration from the draft to the target editing task is realized after the reference draft selected by the target editing task is loaded. The first editing task information can be used for describing result information generated by the editing operation of the target editing task in the first editing state, which covers various initial features after the target editing task in the first editing state is restored from the draft. The reference draft is a draft selected from stored draft information that is capable of causing the target editing task to enter the first editing state. For example, it may be a draft in any editing state saved in a draft box, which is the basis for restoring the editing task.

Execution editing operation restoring from a draft to an editing task corresponding to the draft is triggered may mean that when it is decided to restore the editing task from the stored draft, an operation of restoring from the draft to an editing page corresponding to the editing task is started by a preset triggering mode (such as clicking a draft restoring button, selecting a reference draft entry from the draft box, etc.), which means that it is desired to continue the unfinished editing task.

After a specific reference draft is selected from the stored draft information, draft data corresponding to the reference draft will be loaded, so as to restore the reference draft to the editing state corresponding to the target editing task associated with the reference draft, that is, the first editing state of the target editing task. For example, in video editing, when multiple drafts have been saved previously, one of the drafts is now selected for restoration, then information such as video clips, applied effects, and locations of the clips in this draft will be loaded, so that the video editing task returns to the editing state of the editing task associated with the saved draft at that time.

When the target editing task is restored to the first editing state, first editing task information corresponding to the target editing task in the first editing state will be recorded as when the editing task is initially created. The first editing task information include content loaded from the reference draft and some minor adjustments that may be made immediately after restoration. For example, when a playback speed of a video is adjusted immediately after the draft is restored, this playback speed adjustment will be recorded as part of the first editing task information.

By adopting the above mode, when it is necessary to pause in the process of editing multimedia materials and continue editing in the future, a user can quickly return to the previous editing state by restoring from the draft without restarting, so that the time and energy are saved. Since the reference draft can be selected from the multiple stored drafts for restoration, there are actually multiple possible editing starting points, which makes it possible to try different editing paths, compare editing results of different versions and then make better decisions. This approach encourages iterative editing and continuous improvement and perfection of multimedia materials, and drafts can be saved at different time points and then appropriate drafts can be selected for restoration and further editing as needed, thus gradually optimizing the editing results.

As an optional but non-limiting implementation, the recording the first editing task information associated with the target editing task in the first editing state includes the following steps:

performing a deep copy of the first editing task information related to the target editing task in the first editing state and creating a backup record in a running memory.

The target editing task enters the first editing state at a stage of initially creating an editing task or after a draft restoration operation. In the first editing state, specific attributes and features in the target editing task can be described by the first editing task information. For example, in one image editing task, the first editing state may be a picture that has just been opened, and the first editing task information corresponding to the target editing task of the first editing state at this time may include an original size of the picture, a color mode, some basic adjustments that have been applied, and so on.

In order to better record the first editing task information, a deep copy mode can be adopted. The deep copy means not only copying surface information of the first editing task information, but also recursively copying all objects and sub-objects contained therein, so as to ensure a completely independent copy. This is done to ensure the integrity and independence of the backed-up first editing task information. Even when the original first editing task information changes in a subsequent editing process, the backup copy will not be affected. For example, since ArkTs development language runs on a JS engine and all types of objects are JSObject, this mechanism can be used to perform a deep copy of the first editing task information related to the target editing task in the first editing state.

The first editing task information obtained from the deep copy is stored in the running memory, and the running memory has characteristics of fast reading and writing, and can quickly access the backup data when needed. This backup mode is suitable for a scenario where it needs to quickly restore to the first editing state. For example, when there is misoperation or a software failure in the editing process, the edited content can be quickly restored to the first editing state from the backup in the memory, avoiding data loss and a trouble of restarting editing.

By adopting the above mode, through the deep copy of the first editing task information and the backup in the running memory, the safety of data is greatly improved since the backup copy is completely independent from original data and cannot be influenced by the damage of the original data, and the complete independence of the backup data and the original data is ensured by the deep copy. Modifying the original data will not affect the backup data, and vice versa, which ensures that when the data needs to be restored, the state completely consistent with that when the data is backed up. And, since the backup record is stored in the running memory, restoration to the first editing state can be very fast, and the characteristics of fast reading and writing of the running memory enable the system to load the backed-up first editing task information into the target editing task in a short time. Meanwhile, since the backup is made in the running memory, it will not occupy a lot of disk space and is suitable for various devices and environments.

Optionally, various state data and configuration data of various reference function modules included when the target editing task is edited to form editing results are described in the editing task information; for example, "hasMusic=true" clearly indicates a state about whether a reference function of music is used or not. Optionally, a file path corresponding to the multimedia material in the editing task is also described in the editing task information; for example, the multimedia materials may include pictures, videos, audios and other files, and generally only the file path corresponding to the multimedia materials is recorded in the memory.

Optionally, the editing task information may be represented by string and number types, and these data types are relatively simple, occupy less storage space, and are easy to process and store.

Optionally, the multimedia materials are usually large, and will occupy a lot of resources when they are directly stored in the memory, so that generally only the file path of the multimedia materials is recorded in the memory; and in this way, the multimedia materials can be loaded according to the file path when needed, avoiding unnecessary memory occupation. The multimedia materials are usually stored in a specific directory on a disk or stored through cloud storage. In application, a user can use an API of a file system or a special multimedia library to manage and access the multimedia materials.

S120: determining second editing task information associated with a second editing state, where the second editing state is an editing state where editing operation continued to be triggered for the target editing task already in the first editing state.

After it has been determined that the target editing task is in the first editing state, and the first editing task information associated with the target editing task in the first editing state has been recorded, a series of editing operations can be continued for the target editing task on the basis of the target editing task in the first editing state, and the target editing task can enter the second editing state as the editing operation continued to be triggered for the target editing task already in the first editing state. For example, in image editing, the description that the target editing task is in the first editing state may mean that one picture has been loaded and simply cropped; and when further operations such as adding a filter and adjusting a color are performed, the target editing task is triggered to be transitioned to the second editing state.

Optionally, as new editing operations are continued on the basis of the target editing task in the first editing state, changes of editing results corresponding to the target editing task are monitored and recorded in real time, including but not limited to changes of editing results after the execution of editing operations such as pixel modification of an image, clip editing of a video, volume adjustment of an audio, etc. Once the new editing operations are completed, second editing task information associated with the target editing task in the second editing state is determined. The second editing task information will describe the results of the target editing task in the second editing state in detail, including all changes from the first editing state to the second editing state. For example, in document editing, the first editing state may be that some texts have been entered, and the second editing state may be that operations such as adjusting formats of these texts and adding pictures have been performed on these texts, and these specific changes will be recorded in the second editing task information.

With the adoption of the above process, every step and change by a user in an editing process can be completely recorded by determining the second editing state and the associated second editing task information, which is particularly important for the complicated multimedia material editing task, and an editing history can be reviewed and traced back at any time, which is convenient for modification and adjustment. In the process of editing multimedia materials, requirements and creativity may change constantly, and determining the second editing state and associated task information can allow the system to flexibly adapt to these changes and record new editing operations and results at any time, thus providing greater creative freedom and flexibility for the editing of the multimedia materials.

As an optional but non-limiting implementation, the determining second editing task information associated with a second editing state includes the following steps C1-C2:

Step C1: continuing to perform editing processing on the target editing task in the first editing state to change the target editing task from the first editing state to the second editing state, in response to the editing operation triggered on the target editing task in the first editing state.

Step C2: recording the second editing task information associated with the target editing task in the second editing state.

When an editing operation is performed on the target editing task in the first editing state, this editing operation will be detected and responded. For example, in image editing, editing operations such as cropping and color adjustment may be performed on the picture in the first editing state. According to the editing operations triggered for the target editing task, the target editing task is further edited, which will gradually make the state of the target editing task transition from the first editing state to the second editing state. For example, in video editing, the first editing state is an original video clip, and after editing operations such as editing and adding effects, it enters the second editing state.

After the target editing task enters the second editing state, second editing task information when the target editing task is in the second editing state is recorded, and these second editing task information includes specific features of the target editing task in the second editing state. For example, in document editing, the second editing task information may include newly added text content, a modified format, etc.

By adopting the above mode, the editing operations are continued on the basis of the first editing state, and smooth transition from the first editing state to the second editing state is realized. By recording the second editing task information, each step and change in the editing process can be accurately recorded, and an evolution process from the first editing state to the second editing state can be learned. In this way, when the user needs to save the current editing state or restore to a previous state, the user can switch between different editing states at any time according to own creativity and needs, and carry out flexible editing operations.

As an optional but non-limiting implementation, the recording the second editing task information associated with the target editing task in the second editing state includes the following steps:

performing a deep copy of the second editing task information related to the target editing task in the second editing state and creating a backup record in a running memory.

The above process is equal to the process of performing a deep copy of the first editing task information related to the target editing task in the first editing state and creating a backup record in a running memory, which is not repeated here.

S130: performing draft storage on the second editing state of the target editing task when the draft storage is triggered for the target editing task in the second editing state, where the draft storage for the second editing state of the target editing task is determined based on an editing task information difference between the second editing task information and the first editing task information.

The second editing state is an editing state of the target editing task where the target editing task in the first editing state performs one or more editing operations, which has more changes and developments than the first editing state. Triggering the draft storage for the target editing task in the second editing state may refer to a process of storing the draft that can restore and display the editing result caused by editing processing by the triggered editing operation when the target editing task is in the second editing state. The editing task information difference may refer to a difference part of editing task information between the second editing task information and the first editing task information, that is, the change content of the editing task information from the first editing state to the second editing state.

Referring to FIG. 2, when it is decided to save the target editing task in the second editing state, a draft storage operation is triggered, and the draft storage of the target editing task in the second editing state is implemented by presetting a draft storage button, a shortcut key or an automatic saving mechanism. For example, in the image editing software, the user may click a "save draft" button to trigger the draft storage operation. The draft storage is when the target editing task is in the second editing state realized according to the editing task information difference between the second editing task information and the first editing task information. That is to say, the first editing task information and the second editing task information are obtained first, and then the differences between the first editing task information and the second editing task information are compared, and the changed content from the first editing state to the second editing state is described by using this difference part of the editing task information, thereby achieving the draft storage for the second editing state of the target editing task.

When the draft storage is triggered for the target editing task in the second editing state, the content of the draft is determined by the editing task information difference between the second editing task information and the first editing task information. In this way, the storage efficiency is greatly improved. It is not necessary to repeatedly store the information that has been saved in the first editing state, but only to record the changed part from the first editing state to the second editing state, thus greatly reducing the volume of stored data. For example, when a basic clip of the video has been stored in the first editing state, when storing the draft in the second editing state, it is only necessary to record the newly added effects, adjusted parameters and other changes, instead of storing the whole video again. This difference storage mode also speeds up the storage, and can reduce the storage time especially for large multimedia material editing tasks; in particular, when editing operations are frequently carried out and drafts need to be stored at any time, since the draft storage is performed based on the difference, the reading and writing times during the draft storage can be greatly reduced, and the draft storage speed will not be affected because a large number of drafts need to be stored each time, and the fluency of creation will not be affected by a too long storage process.

Since the draft is determined based on the editing task information difference, when the draft needs to be restored, the target editing task can be quickly restored to a specific editing state. When the user wants to return to the second editing state, it is only necessary to read the first editing task information, and then apply the second editing task information of the difference part, so that the previous editing result can be restored accurately. This is very helpful for the user who may need to backtrack and modify many times in the editing process, the time and energy can be saved and the editing efficiency can be improved. Meanwhile, this mode also reduces the risk of recovery errors. Because only the information of the difference part, rather than all the data of the whole editing task, needs to be processed, possible errors and confusion in a data recovery process are reduced.

According to technical solutions of the embodiments of the present disclosure, by determining first editing task information associated with a first editing state and second editing task information associated with a second editing state, the editing state of the target editing task at different stages can be accurately captured, which means that, for multimedia material editing tasks, a specific situation of each editing task from an initial editing state to a subsequent further editing state can be recorded in detail. When draft storage is triggered for the target editing task in the second editing state, draft content is determined according to an editing task information difference between the second editing task information and the first editing task information, and it is not necessary to repeatedly store the editing task information already in the first editing state to describe the draft content, and only a changed part from the first editing state to the second editing state needs to be recorded, so that an amount of stored data is greatly reduced and this difference storage mode speeds up the storage. Since the draft storage is performed based on the difference, reading and writing times can be greatly reduced when the draft storage is performed, a situation that a draft storage speed is affected because a large amount of storage is required for each draft storage is avoided, and especially when editing operations are frequently performed and the draft needs to be stored at any time, the fluency of creation will not be affected by a too long storage process. Since the draft is determined based on the editing task information difference, the target editing task can be quickly restored to a specific editing state when the draft needs to be restored. Because only information of a difference part, rather than all data of the entire editing task, needs to be processed, possible errors and confusion in a data recovery process are reduced.

Figure 3:
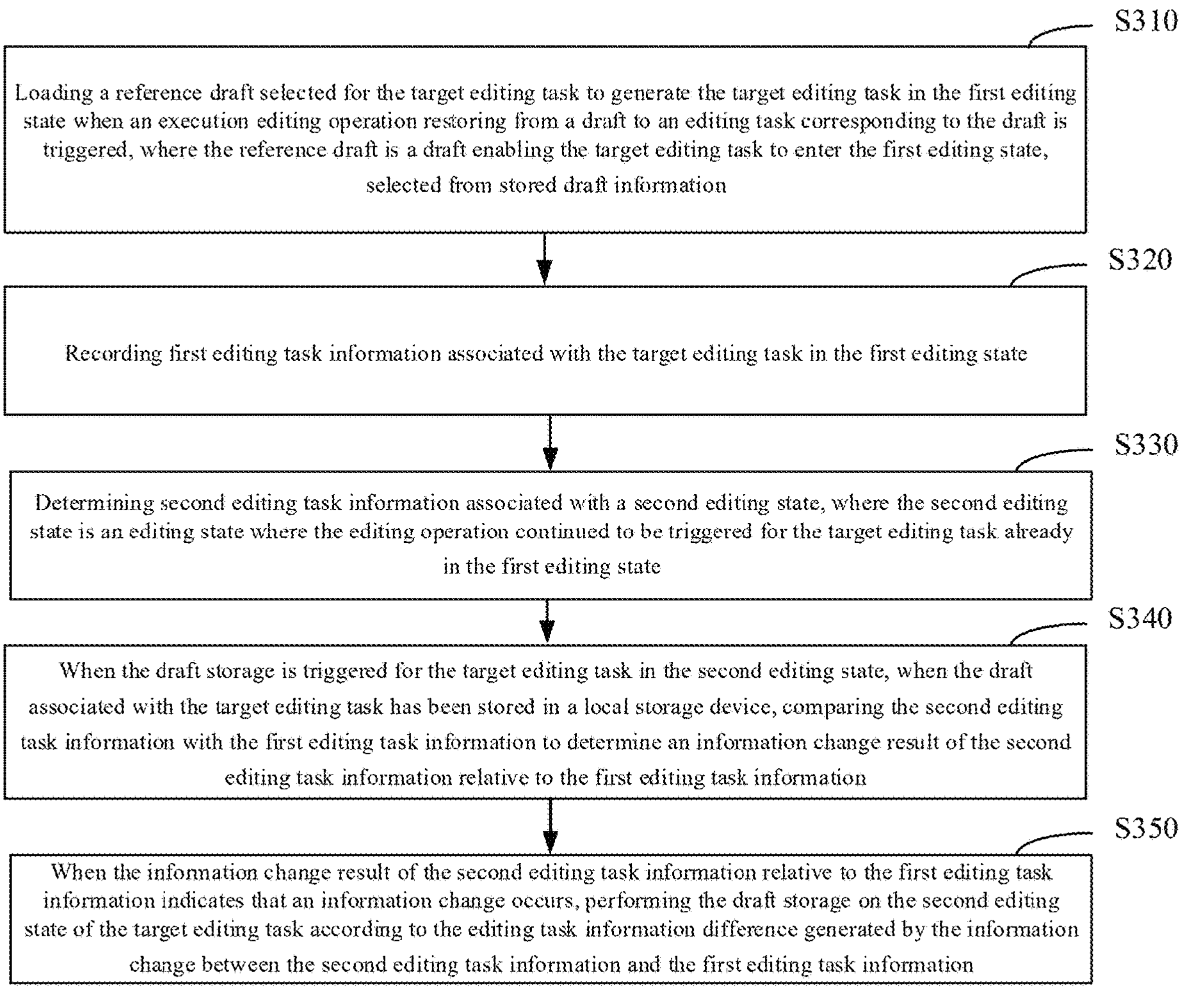
FIG. 3 is a flow diagram of another method for editing and processing multimedia material provided by an embodiment of the present disclosure.

FIG. 3 is a flow diagram of another method for editing and processing multimedia material provided by an embodiment of the present disclosure. Based on the technical solution of the above embodiment, the technical solution of this embodiment further optimizes the process of storing the draft of the second editing state of the target editing task in the above embodiment, and this embodiment can be combined with various alternatives in one or more of the above embodiments.

As shown in FIG. 3, the method for editing and processing multimedia material of the embodiment of the present disclosure may include the following steps:

S310: loading a reference draft selected for the target editing task to generate the target editing task in the first editing state when an execution editing operation restoring from a draft to an editing task corresponding to the draft is triggered, where the reference draft is a draft enabling the target editing task to enter the first editing state, selected from stored draft information.

S320: recording first editing task information associated with the target editing task in the first editing state.

The first editing state is an initial editing state where a target editing task is initially triggered, the first editing task information is used for describing an editing result generated by a triggered editing operation in the editing state for the target editing task, and the target editing task is a multimedia material editing task.

S330: determining second editing task information associated with a second editing state, where the second editing state is an editing state where the editing operation continued to be triggered for the target editing task already in the first editing state.

S340: when the draft storage is triggered for the target editing task in the second editing state, when the draft associated with the target editing task has been stored in a local storage device, comparing the second editing task information with the first editing task information to determine an information change result of the second editing task information relative to the first editing task information.

Figure 4:
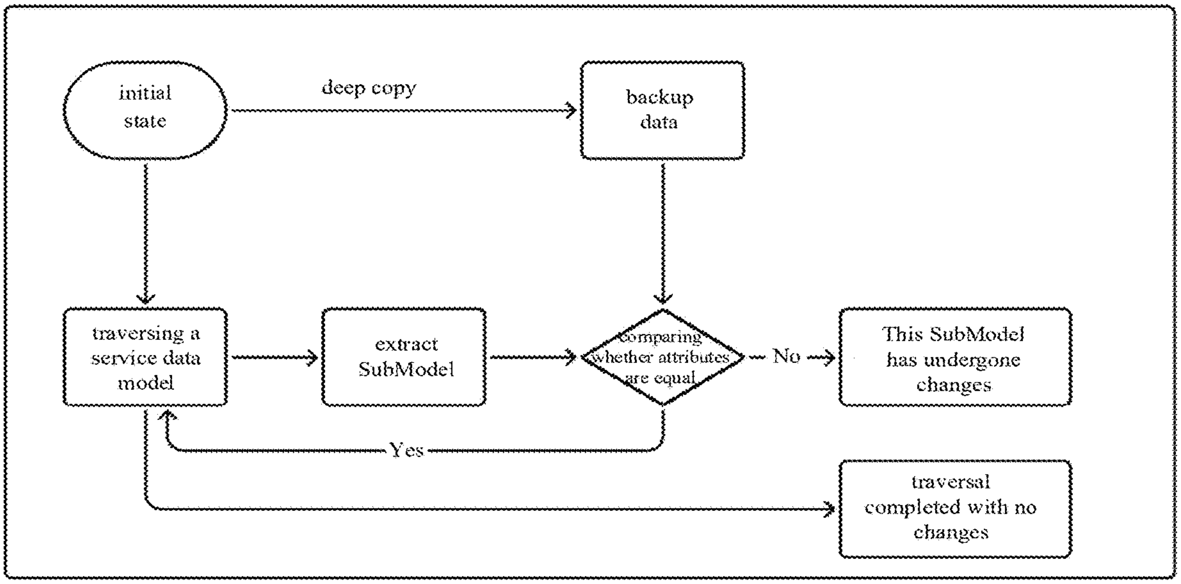
FIG. 4 is a schematic diagram of an editing task information comparison provided by an embodiment of the present disclosure.

Referring to FIG. 4, when the target editing task in the second editing state is operated, when it is decided to trigger a draft storage function, it means that it is desirable to temporarily save the editing progress of the editing task for the convenience of subsequent editing, or to actively store the editing task in fear of data loss due to an unexpected situation. Firstly, it is detected whether the draft associated with the target editing task has been stored in the local storage device, especially whether the draft of the target editing task in the first editing state has been performed.

Referring to FIG. 4, the second editing task information associated with the target editing task currently in the second editing state is compared with the previously stored first editing task information. The purpose of comparison is to determine what changes have taken place from the first editing state to the second editing state. This includes but is not limited to the content added, deleted or modified. For example, in video editing, the content that may be compared include the editing of video clips, the addition of effects, the adjustment of an audio, etc.

Referring to FIG. 4, by comparing the second editing task information with the first editing task information, the information change result of the second editing task information relative to the first editing task information is determined, by comparing the differences between the two types of editing task information, it can be determined which parameters may be changed during the process from the first editing state to the second editing state, and specific content of the changes. This change result can be a concrete operation list or an abstract description, depending on the implementations. For example, the information change result may be a specific description such as "a new video clip has been added", "the brightness and contrast of the video have been adjusted", or a more abstract representation such as "the content has been significantly modified", and so on.

By only storing the change result from the first editing state to the second editing state, instead of repeatedly storing the data of the whole editing task, the storage space can be greatly saved. Especially for large multimedia editing tasks, this mode can significantly improve the storage efficiency. When the draft needs to be restored, it can be quickly restored to the second editing state only according to the change result and the previously stored first editing task information.

As an optional but non-limiting implementation, the comparing the second editing task information with the first editing task information to determine an information change result of the second editing task information relative to the first editing task information includes the following steps D1-D2:

Step D1: traversing and acquiring each item of reference function module data in the second editing task information and each item of reference function module data in the first editing task information and performing an item-by-item comparison, where the second editing task information and the first editing task information include reference function module data having an equal type, and the second editing task information and the first editing task information are configured for an equal item of reference function module data, to use the reference function attribute field having an equal type to describe.

Step D2: determining a data change result between the second editing task information and the first editing task information based on an item-by-item comparison result between each item of reference function module data in the second editing task information and each item of reference function module data in the first editing task information.

Referring to FIG. 4, the second editing task information and the first editing task information are traversed, and respectively describe editing results of the target editing task in different editing states. Traversal acquisition means that each item of reference function module data SubModel in the second editing task information and the first editing task information will be checked and acquired one by one. Reference function module data can be understood as data of function parts constituting the editing task. For example, in image editing, it may include color adjustment module data, filter module data, cropping module data, etc.; and in video editing, there may be video clip module data, effect module data, transition module data and so on. Optionally, each item of reference function module data in the editing task information is configured and described by using a reference function attribute field, and the reference function attribute field is used for describing an attribute field of an editing function adopted by the video material and the audio material.

And, the two types of editing task information are configured to describe the equal reference function attribute field in the equal reference function module data, which means that the description mode of the equal function module in different editing states is consistent, and the two types of editing task information use the equal attribute field to describe their characteristics, differing only in resultant values. For example, for an "audio adjustment" function module, attribute fields of "volume size", "tone level" or the like may be used for describing the state thereof. In a traversal process, comparing each item of the reference function module data in the second editing task information with the corresponding item in the first editing task information one by one will acquire a comparison result of each item of reference function module data, and these results may be completely the equal, partially the equal or completely different. The content of comparison includes but is not limited to parameter values and state flags of the module.

Referring to FIG. 4, when a certain item of certain reference function module data is different in the two types of editing task information, then this difference will be recorded and used as a part of the data change result between the second editing task information and the first editing task information. For example, when an intensity value of a certain filter changes in the second editing task information, this change will be recorded and used for describing the change from the first editing state to the second editing state. That is, based on the item-by-item comparison result, an overall information change result between the second editing task information and the first editing task information is comprehensively analyzed and determined, and this information change result can clearly show what specific changes have taken place from the first editing state to the second editing state. Finally, by integrating the comparison results of all the reference function module data, a complete data change result between the second editing task information and the first editing task information is obtained.

By adopting the above mode, the specific change from the first editing state to the second editing state can be determined very accurately by comparing each item of the reference function module data having an equal type and using the reference function attribute field having an equal type for description. And, after the data change result is determined, only these changed parts, rather than data of the whole editing task, can be stored, which greatly saves the storage space.

S350: when the information change result of the second editing task information relative to the first editing task information indicates that an information change occurs, performing the draft storage on the second editing state of the target editing task according to the editing task information difference generated by the information change between the second editing task information and the first editing task information.

Referring to FIG. 4, determining whether the second editing task information has changed relative to the first editing task information means that, by making a difference judgement by comparing items of reference function module data of the two types of editing task information, when any difference is found in the items of reference function module data, it is considered that the information change occurs. For example, in an image editing task, image color parameters and filters in the first editing state are compared with corresponding parameters in the second editing state, and when there is any difference, it means that the information change occurs.

Optionally, by recursively traversing and comparing values of the second editing task information relative to the function attribute fields in each item of reference function module data in the first editing task information item by item, any subtle changes of the second editing task information relative to the first editing task information can be detected very accurately.

Referring to FIG. 4, when the information change result of the second editing task information relative to the first editing task information indicates that an information change occurs, it is necessary to determine the editing task information difference generated by the information change between the second editing task information and the first editing task information, which difference refers to a specific change part from the first editing state to the second editing state. For example, in video editing, it may include the addition of new video clips, the adjustment of parameters of a certain effect and other specific changes. By analyzing the two types of editing task information, these differences can be accurately determined. When the information change result of the second editing task information relative to the first editing task information indicates that there is no information change, the draft storage is not performed for the second editing state of the target editing task.

According to the determined editing task information difference, performing the draft storage on the second editing state of the target editing task means that only the difference change part of the editing task information from the first editing state to the second editing state is stored, instead of storing all the data of the second editing task information corresponding to the second editing state. For example, in audio editing, when only the volume is adjusted from the first editing state to the second editing state, then when storing the draft, it is only necessary to record a changed value of the volume, rather than the entire audio file and all editing settings.

With the adoption of the above solution, only the editing task information difference is stored, so that the volume of stored data is reduced greatly. For large multimedia editing tasks, this can save a lot of storage space and improve the storage efficiency. Especially in a case of frequently performing editing operations, redundant storage of large amounts of identical data can be avoided. When the draft needs to be restored, because only the difference part is stored, the restoration process can be faster. The system can load the draft in the first editing state, and then quickly update it according to the difference to restore to the second editing state.

As an optional but non-limiting implementation, the performing the draft storage on the second editing state of the target editing task according to the editing task information difference between the second editing task information and the first editing task information includes the following steps E1-E2:

Step E1: generating draft state description information for the target editing task in the second editing state according to the editing task information difference between the second editing task information and the first editing task information, where the draft state description information is used for indicating reference function module data where a change occurs in a draft for the target editing task in the second editing state relative to a draft for the target editing task in the first editing state.

Step E2: storing the draft state description information for the target editing task in the second editing state.

After the difference between the second editing task information and the first editing task information is determined, the draft state description information for the target editing task in the second editing state is generated by using the editing task information difference, which difference represents the change content from the first editing state to the second editing state. The draft state description information is used for indicating reference function module data representing a change in a draft for the target editing task in the second editing state relative to a draft for the target editing task in the first editing state. For example, when one new video clip is added and the color saturation is adjusted from the first state to the second state in video editing, the draft state description information will record these changed function module data.

Only the draft state description information, all the data of the second editing state, is stored, so that the storage requirements are reduced. For large multimedia editing tasks or frequent editing, this mode can save a lot of storage space and improve the storage efficiency. When it is necessary to restore to the second editing state, the second editing state can be quickly reconstructed according to the stored draft state description information and the data of the first editing state. Because only the changed parts, rather than the data of the whole task, need to be processed, the recovery speed is faster.

The draft state description information can be used as an important basis for version management. By viewing the draft state description information of different versions, the changed content of each version can be clearly understood, which is convenient for version comparison and selection, and the user can also restore the editing state of a specific version as needed. Furthermore, the generated draft state description information is stored, so that the user can restore to the second editing state or view an editing history in combination with the first editing task information of the first editing state when necessary. The storage mode can be storing in a local database, a file system or cloud storage, etc., depending on the application requirements.

As an optional but non-limiting implementation, the draft storage when the target editing task is in the second editing state is to store each item of reference function module data in a structure form of a database table structure, and to store different item of reference function module data by columns, with each item of reference function module data stored correspondingly in a column of the database table.

When the target editing task is in the second editing state, the draft is stored in the form of a database table, which means that various information of the editing task is organized into a tabular form in the database according to certain rules. For example, SQLite is a lightweight embedded relational database management system. For example, in a multimedia editing task, a database table can be created to store draft state description information, where each column corresponds to different item of reference function module data for draft state description information corresponding to each edition editing state. In the draft state description information corresponding to the equal version of editing state, different item of reference function module data is stored in separate columns, that is, each item of reference function module data stored correspondingly in a column in the database table, which makes a structure of data clearer.

According to technical solutions of the embodiments of the present disclosure, by determining first editing task information associated with a first editing state and second editing task information associated with a second editing state, the editing state of the target editing task at different stages can be accurately captured, which means that, for multimedia material editing tasks, a specific situation of each editing task from an initial editing state to a subsequent further editing state can be recorded in detail. When draft storage is triggered for the target editing task in the second editing state, draft content is determined according to an editing task information difference between the second editing task information and the first editing task information, and it is not necessary to repeatedly store the editing task information already in the first editing state to describe the draft content, and only a changed part from the first editing state to the second editing state needs to be recorded, so that an amount of stored data is greatly reduced and this difference storage mode speeds up the storage. Especially when editing operations are frequently performed and the draft needs to be stored at any time, the fluency of creation will not be affected by a too long storage process. Since the draft is determined based on the editing task information difference, the target editing task can be quickly restored to a specific editing state when the draft needs to be restored. Because only information of a difference part, rather than all data of the entire editing task, needs to be processed, possible errors and confusion in a data recovery process are reduced.

Figure 5:
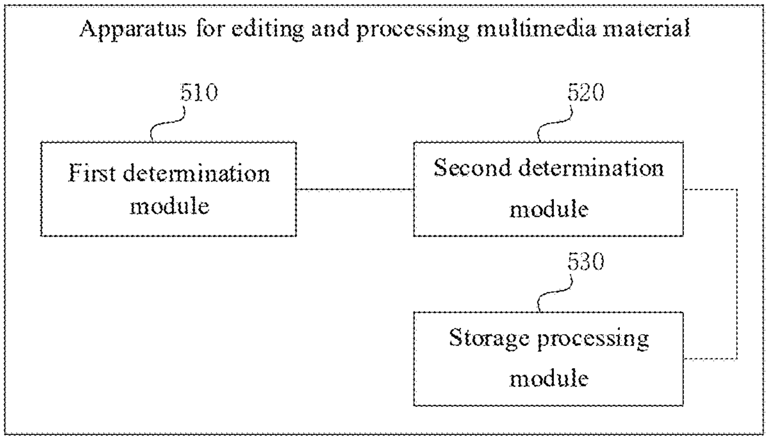
FIG. 5 is a structural schematic diagram of an apparatus for editing and processing multimedia material provided by an embodiment of the present disclosure.

FIG. 5 is a structural schematic diagram of an apparatus for editing and processing multimedia material provided by an embodiment of the present disclosure. The embodiment of the present disclosure is suitable for saving drafts in a process of editing multimedia materials. The apparatus for editing and processing multimedia material can be implemented in the form of software and/or hardware, and is generally integrated on any electronic device with a network communication function, which can be a mobile terminal, a PC or a server.

As shown in FIG. 5, the apparatus for editing and processing multimedia material of the embodiment of the present disclosure may include:

a first determination module 510 configured to determine first editing task information associated with a first editing state, where the first editing state is an initial editing state where a target editing task is initially triggered, the first editing task information is used for describing an editing result generated by a triggered editing operation in the editing state for the target editing task, and the target editing task is a multimedia material editing task;

a second determination module 520 configured to determine second editing task information associated with a second editing state, where the second editing state is an editing state after the editing operation continued to be triggered for the target editing task already in the first editing state; and a storage processing module 530 configured to perform draft storage on the second editing state of the target editing task when the draft storage is triggered for the target editing task in the second editing state, where the draft when the target editing task is in the second editing stat is determined based on an editing task information difference between the second editing task information and the first editing task information.

On the basis of the above embodiment, optionally, the determining first editing task information associated with a first editing state includes:

loading a reference draft selected for the target editing task to generate the target editing task in the first editing state when an execution editing operation restoring from a draft to an editing task corresponding to the draft is triggered, where the reference draft is a draft enabling the target editing task to enter the first editing state, selected from stored draft information; and recording first editing task information associated with the target editing task in the first editing state.

On the basis of the above embodiment, optionally, the determining first editing task information associated with a first editing state includes:

loading a target editing template selected for the target editing task to generate the target editing task in the first editing state when an execution editing operation creating the target editing task is triggered; and recording the first editing task information associated with the target editing task in the first editing state.

On the basis of the above embodiment, optionally, the recording the first editing task information associated with the target editing task in the first editing state includes:

performing a deep copy of the first editing task information related to the target editing task in the first editing state and creating a backup record in a running memory.

On the basis of the above embodiment, optionally, the determining second editing task information associated with a second editing state includes:

continuing to perform editing processing on the target editing task in the first editing state to change the target editing task from the first editing state to the second editing state, in response to the editing operation triggered on the target editing task in the first editing state; and recording the second editing task information associated with the target editing task in the second editing state.

On the basis of the above embodiment, optionally, the recording the second editing task information associated with the target editing task in the second editing state includes:

performing a deep copy of the second editing task information related to the target editing task in the second editing state and creating a backup record in a running memory.

On the basis of the above embodiment, optionally, the performing draft storage on the second editing state of the target editing task includes:

when the draft associated with the target editing task has been stored in a local storage device, comparing the second editing task information with the first editing task information to determine an information change result of the second editing task information relative to the first editing task information; and when the information change result of the second editing task information relative to the first editing task information indicates that an information change occurs, performing the draft storage on the second editing state of the target editing task according to the editing task information difference generated by the information change between the second editing task information and the first editing task information.

On the basis of the above embodiment, optionally, the comparing the second editing task information with the first editing task information to determine an information change result of the second editing task information relative to the first editing task information includes:

traversing and acquiring each item of reference function module data in the second editing task information and each item of reference function module data in the first editing task information and performing an item-by-item comparison, where the second editing task information and the first editing task information include an reference function module data having an equal type, and the second editing task information and the first editing task information are configured for an equal item of reference function module data, to use the reference function attribute field having an equal type to describe; and determining a data change result between the second editing task information and the first editing task information based on an item-by-item comparison result between each item of reference function module data in the second editing task information and each item of reference function module data in the first editing task information.

On the basis of the above embodiment, optionally, the performing the draft storage on the second editing state of the target editing task according to the editing task information difference between the second editing task information and the first editing task information includes:

generating draft state description information for the target editing task in the second editing state according to the editing task information difference between the second editing task information and the first editing task information, where the draft state description information is used for indicating reference function module data representing a change in a draft for the target editing task in the second editing state relative to a draft for the target editing task in the first editing state; and storing the draft state description information for the target editing task in the second editing state.

On the basis of the above embodiment, optionally, the draft storage when the target editing task is in the second editing state is to store each item of reference function module data in a structure form of a database table, and to store different item of reference function module data by columns, with each item of reference function module data stored correspondingly in a column of the database table.

According to technical solutions of the embodiments of the present disclosure, by determining first editing task information associated with a first editing state and second editing task information associated with a second editing state, the editing state of the target editing task at different stages can be accurately captured, which means that, for multimedia material editing tasks, a specific situation of each editing task from an initial editing state to a subsequent further editing state can be recorded in detail. When draft storage is triggered for the target editing task in the second editing state, draft content is determined according to an editing task information difference between the second editing task information and the first editing task information, and it is not necessary to repeatedly store the editing task information already in the first editing state to describe the draft content, and only a changed part from the first editing state to the second editing state needs to be recorded, so that an amount of stored data is greatly reduced and this difference storage mode speeds up the storage. Especially when editing operations are frequently performed and the draft needs to be stored at any time, the fluency of creation will not be affected by a too long storage process. Since the draft is determined based on the editing task information difference, the target editing task can be quickly restored to a specific editing state when the draft needs to be restored. Because only information of a difference part, rather than all data of the entire editing task, needs to be processed, possible errors and confusion in a data recovery process are reduced.

The apparatus for editing and processing multimedia material provided by the embodiment of the present disclosure can execute the method for editing and processing multimedia material provided by any of embodiments of the present disclosure, and has corresponding functional modules for executing the method for editing and processing multimedia material and beneficial effects.

It is worth noting that the various units and modules included in the above apparatus are only divided according to functional logics, but not limited thereto, as long as the corresponding functions can be implemented; in addition, the specific names of the functional units are only for the convenience of distinguishing between each other, and are not used to limit the protection scope of the embodiments of the present disclosure.

Figure 6:
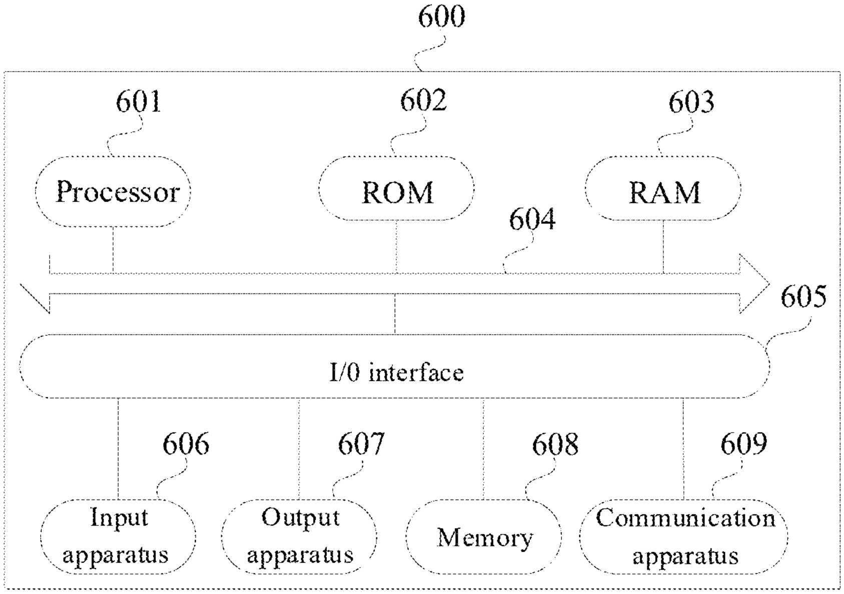
FIG. 6 is a structural schematic diagram of an electronic device for implementing the method for editing and processing multimedia material provided by an embodiment of the present disclosure.

FIG. 6 is a structural schematic diagram of an electronic device for implementing the method for editing and processing multimedia material provided by an embodiment of the present disclosure.

Referring to FIG. 6, which shows a structural schematic diagram of an electronic device (such as the terminal device or server in FIG. 6) 600 suitable for implementing the embodiments of the present disclosure. The terminal devices in the embodiments of the present disclosure may include but are not limited to mobile terminals such as mobile phones, laptop computers, digital broadcast receivers, PDAs (personal digital assistants), PADs (tablet computers), PMPs (portable multimedia players), vehicle-mounted terminals (such as vehicle navigation terminals), and fixed terminals such as digital TVs and desktop computers. The electronic device shown in FIG. 6 is merely an example and should not impose any limitation on the functions and scope of use of the embodiments of the present disclosure.

As shown in FIG. 6, the electronic device 600 may include a processor (such as a central processing unit, graphics processing unit, etc.) 601, which can perform various appropriate actions and processing according to programs stored in a read-only memory (ROM) 602 or programs loaded from a memory 608 into a random access memory (RAM) 603. In the RAM 603, various programs and data required for the operation of the electronic device 600 are also stored. The processor 601, ROM 602, and RAM 603 are connected to each other via a bus 604. An input/output (I/O) interface 605 is also connected to the bus 604.

Generally, the following apparatuses may be connected to the I/O interface 605: an input apparatus 606 including, for example, a touch screen, touchpad, keyboard, mouse, camera, microphone, accelerometer, gyroscope, etc.; an output apparatus 607 including, for example, a liquid crystal display (LCD), speaker, vibrator, etc.; a memory 608 including, for example, a magnetic tape, hard disk, etc.; and a communication apparatus 609. The communication apparatus 609 may allow the electronic device 600 to perform wireless or wired communication with other devices to exchange data. Although FIG. 6 shows an electronic device 600 with various apparatuses, it should be understood that it is not required to implement or have all the shown apparatuses. More or fewer apparatuses may be alternatively implemented or provided.

In particular, according to the embodiments of the present disclosure, the processes described above with reference to the flowcharts may be implemented as computer software programs. For example, the embodiments of the present disclosure include a computer program product including a computer program carried on a non-transitory computer-readable medium, the computer program containing program code for executing the multimedia material editing processing method shown in the flowchart. In such an embodiment, the computer program may be downloaded and installed from a network via the communication apparatus 609, or installed from the memory 608, or installed from the ROM 602. When the computer program is executed by the processor 601, the above-described functions defined in the multimedia material editing processing method of the embodiments of the present disclosure are performed.

The names of messages or information exchanged between apparatuses in the embodiments of the present disclosure are for illustrative purposes only, and are not intended to limit the scope of the messages or information.

The electronic device provided by the embodiment of the present disclosure belongs to the equal inventive concept as the method for editing and processing multimedia material provided by the embodiment above, technical details that are not described in detail in the present embodiment can be referred to the embodiments above, and the present embodiment has the equal beneficial effects as the embodiments above.

An embodiment of the present disclosure provides a computer storage medium having stored thereon computer programs, which, when executed by a processor, implement the method for editing and processing multimedia material provided in the embodiment above.

It should be noted that the computer-readable medium mentioned in the present disclosure may be a computer-readable signal medium, a computer-readable storage medium, or any combination of the two. A computer-readable storage medium may be, for example but not limited to, an electrical, magnetic, optical, electromagnetic, infrared, or semiconductor system, apparatus, or device, or any combination thereof. More specific examples of computer-readable storage media may include but are not limited to: electrical connections with one or more wires, portable computer disks, hard disks, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination of the above. In the present disclosure, a computer-readable storage medium may be any tangible medium that contains or stores a program usable by or in combination with an instruction execution system, apparatus, or device. In the present disclosure, a computer-readable signal medium may include a data signal propagated in a baseband or as part of a carrier wave, in which computer-readable program code is embodied. Such a propagated data signal may take various forms, including but not limited to electromagnetic signals, optical signals, or any suitable combination of the above. A computer-readable signal medium may also be any computer-readable medium other than a computer-readable storage medium, which can transmit, propagate, or transport a program for use by or in combination with an instruction execution system, apparatus, or device. The program code contained on a computer-readable medium may be transmitted via any appropriate medium, including but not limited to wires, optical cables, RF (radio frequency), etc., or any suitable combination of the above.

In some implementations, clients and servers may communicate using any currently known or future-developed network protocols such as HTTP (HyperText Transfer Protocol), and may be interconnected with digital data communication in any form or medium (e.g., a communication network). Examples of communication networks include local area networks ("LAN"), wide area networks ("WAN"), the Internet (e.g., the Internet), and peer-to-peer networks (e.g., ad hoc peer-to-peer networks), as well as any currently known or future-developed networks.

The above-mentioned computer-readable medium may be contained in the above-mentioned electronic device; or it may exist independently without being assembled into the electronic device.

The computer-readable medium carries one or more programs which, when executed by the electronic device, cause the electronic device to: determine first editing task information associated with a first editing state, where the first editing state is an initial editing state where a target editing task is initially triggered, the first editing task information is used for describing an editing result generated by a triggered editing operation in the editing state for the target editing task, and the target editing task is a multimedia material editing task; determine second editing task information associated with a second editing state, where the second editing state is an editing state after the editing operation continued to be triggered for the target editing task already in the first editing state; and perform the draft storage on the second editing state of the target editing task when the draft storage is triggered for the target editing task in the second editing state, where the draft storage for the second editing state of the target editing task is determined based on an editing task information difference between the second editing task information and the first editing task information.

Computer program code for performing the operations of the present disclosure may be written in one or more programming languages or combinations thereof, including but not limited to object-oriented programming languages such as Java, Smalltalk, C++, and conventional procedural programming languages such as the "C" language or similar programming languages. The program code may execute entirely on the user's computer, partially on the user's computer, execute as a stand-alone software package, partially on the user's computer and partially on a remote computer, or execute entirely on the remote computer or server. In cases involving a remote computer, the remote computer may be connected to the user's computer through any type of network—including a local area network (LAN) or a wide area network (WAN)—or may be connected to an external computer (e.g., via the Internet using an Internet service provider).

The flowcharts and block diagrams in the accompanying drawings illustrate the possible implementation architectures, functions, and operations of systems, methods, and computer program products according to various embodiments of the present disclosure. In this regard, each block in a flowchart or block diagram may represent a module, segment, or portion of code containing one or more executable instructions for implementing the specified logical function(s). It should also be noted that in some alternative implementations, the functions marked in the blocks may occur in an order different from that marked in the drawings. For example, two consecutively shown blocks may in fact be executed substantially in parallel, or they may sometimes be executed in the reverse order, depending on the functions involved. It should also be noted that each block of the block diagrams and/or flowcharts, and combinations of blocks in the block diagrams and/or flowcharts, may be implemented by special hardware-based systems that perform the specified functions or operations, or by combinations of special hardware and computer instructions.

The units involved in the embodiments described in the present disclosure may be implemented by software or hardware. The name of the unit does not constitute a limitation on the unit itself in some cases. For example, a first acquisition unit can also be described as "a unit that acquires at least two Internet protocol addresses".

The functions described above herein may be performed at least in part by one or more hardware logic components. For example, without limitation, exemplary types of hardware logic components that may be used include: field-programmable gate arrays (FPGA), application-specific integrated circuits (ASIC), application-specific standard products (ASSP), system-on-a-chip (SOC), complex programmable logic devices (CPLD), and the like.

In the context of the present disclosure, a machine-readable medium may be a tangible medium that can contain or store a program for use by or in combination with an instruction execution system, apparatus, or device. A machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of machine-readable storage media will include electrical connections based on one or more wires, portable computer disks, hard disks, random access memory (RAM), read-only memory (ROM), erasable programmable read-only memory (EPROM or flash memory), optical fibers, compact disc read-only memory (CD-ROM), optical storage devices, magnetic storage devices, or any suitable combination of the foregoing.

The above description is only a preferred embodiment of the present disclosure and an explanation of the applied technical principles. Those skilled in the art should understand that the scope of the present disclosure is not limited to the technical solutions formed by the specific combination of the above technical features, but should also cover other technical solutions formed by any combination of the above technical features or their equivalent features without departing from the inventive concept of the present disclosure. For example, technical solutions formed by mutually replacing the above features with technical features disclosed in the present disclosure (but not limited to) having similar functions.

Furthermore, although operations are depicted in a specific order, this should not be understood as requiring that such operations be performed in the specific order shown or in sequential order. In certain environments, multitasking and parallel processing may be advantageous. Similarly, although several specific implementation details are included in the above discussion, these should not be construed as limitations on the scope of the present disclosure. Certain features described in the context of separate embodiments may also be combined and implemented in a single embodiment. Conversely, various features described in the context of a single embodiment may also be implemented separately or in any suitable subcombination in multiple embodiments.

Although the subject matter has been described in language specific to structural features and/or methodological logical acts, it should be understood that the subject matter defined in the appended claims is not necessarily limited to the specific features or acts described above. Rather, the specific features and acts described above are merely example forms for implementing the claims.

The invention claimed is:

1. A method for editing and processing multimedia material, comprising:

determining first editing task information associated with a first editing state, wherein the first editing state is an editing state where an editing task is initially triggered, the first editing task information is used for describing an editing result generated by a triggered editing operation in the editing state for the editing task, and the editing task is a multimedia material editing task;

determining second editing task information associated with a second editing state, wherein the second editing state is an editing state where editing operation continued to be triggered for the editing task already in the first editing state; and performing draft storage on the second editing state of the editing task when the draft storage is triggered for the editing task in the second editing state, wherein the draft storage for the second editing state of the editing task is determined based on an editing task information difference between the second editing task information and the first editing task information, wherein the performing draft storage on the second editing state of the editing task comprises:

when a draft associated with the editing task has been stored in a local storage device, comparing the second editing task information with the first editing task information to determine an information change result of the second editing task information relative to the first editing task information; and when the information change result indicates that an information change occurs, performing the draft storage on the second editing state of the editing task according to the editing task information difference generated by an information change between the second editing task information and the first editing task information.

2. The method according to claim 1, wherein the determining first editing task information associated with a first editing state comprises:

loading a reference draft selected for the editing task to generate the editing task in the first editing state when an execution editing operation restoring from a draft to an editing task corresponding to the draft is triggered, wherein the reference draft is a draft enabling the editing task to enter the first editing state, selected from stored draft information; and recording first editing task information associated with the editing task in the first editing state.

3. The method according to claim 1, wherein the determining first editing task information associated with a first editing state comprises:

loading an editing template selected for the editing task to generate the editing task in the first editing state when an execution editing operation creating the editing task is triggered; and recording first editing task information associated with the editing task in the first editing state.

4. The method according to claim 2, wherein the recording first editing task information associated with the editing task in the first editing state comprises:

performing a deep copy of the first editing task information related to the editing task in the first editing state and creating a backup record in a running memory.

5. The method according to claim 3, wherein the recording first editing task information associated with the editing task in the first editing state comprises:

performing a deep copy of the first editing task information related to the editing task in the first editing state and creating a backup record in a running memory.

6. The method according to claim 1, wherein the determining second editing task information associated with a second editing state comprises:

continuing to perform editing processing on the editing task in the first editing state to change the editing task from the first editing state to the second editing state, in response to the editing operation triggered on the editing task in the first editing state; and recording second editing task information associated with the editing task in the second editing state.

7. The method according to claim 6, wherein the recording second editing task information associated with the editing task in the second editing state comprises:

performing a deep copy of the second editing task information related to the editing task in the second editing state and creating a backup record in a running memory.

8. The method according to claim 1, wherein the comparing the second editing task information with the first editing task information to determine an information change result of the second editing task information relative to the first editing task information comprises:

traversing and acquiring each item of reference function module data in the second editing task information and each item of reference function module data in the first editing task information and performing an item-by-item comparison, wherein the second editing task information and the first editing task information comprise reference function module data having an equal type, and the second editing task information and the first editing task information are configured for an equal item of reference function module data, to use a reference function attribute field having the equal type to describe; and determining a data change result between the second editing task information and the first editing task information based on an item-by-item comparison result between each item of reference function module data in the second editing task information and each item of reference function module data in the first editing task information.

9. The method according to claim 1, wherein the performing draft storage on the second editing state of the editing task according to the editing task information difference between the second editing task information and the first editing task information comprises:

generating draft state description information for the editing task in the second editing state according to the editing task information difference between the second editing task information and the first editing task information, wherein the draft state description information is used for indicating reference function module data where a change occurs in a draft for the editing task in the second editing state relative to a draft for the editing task in the first editing state; and storing the draft state description information for the editing task in the second editing state.

10. The method according to claim 9, wherein the draft storage for the editing task in the second editing state is to store each item of reference function module data in a structure form of a database table, and to store different items of reference function module data by columns, with each item of reference function module data stored correspondingly in a column of the database table.

11. An electronic device, comprising:

one or more processors;

a memory configured to store one or more programs, wherein the one or more programs, when executed by the one or more processors, cause the one or more processors to implement a method for editing and processing multimedia material, and the method comprises:

determining first editing task information associated with a first editing state, wherein the first editing state is an editing state where an editing task is initially triggered, the first editing task information is used for describing an editing result generated by a triggered editing operation in the editing state for the editing task, and the editing task is a multimedia material editing task;

determining second editing task information associated with a second editing state, wherein the second editing state is an editing state where editing operation continued to be triggered for the editing task already in the first editing state; and performing draft storage on the second editing state of the editing task when the draft storage is triggered for the editing task in the second editing state, wherein the draft storage for the second editing state of the editing task is determined based on an editing task information difference between the second editing task information and the first editing task information, wherein the performing draft storage on the second editing state of the editing task comprises:

when a draft associated with the editing task has been stored in a local storage device, comparing the second editing task information with the first editing task information to determine an information change result of the second editing task information relative to the first editing task information; and when the information change result indicates that an information change occurs, performing the draft storage on the second editing state of the editing task according to the editing task information difference generated by an information change between the second editing task information and the first editing task information.

12. The electronic device according to claim 11, wherein the determining first editing task information associated with a first editing state comprises:

loading a reference draft selected for the editing task to generate the editing task in the first editing state when an execution editing operation restoring from a draft to an editing task corresponding to the draft is triggered, wherein the reference draft is a draft enabling the editing task to enter the first editing state, selected from stored draft information; and recording first editing task information associated with the editing task in the first editing state.

13. The electronic device according to claim 11, wherein the determining first editing task information associated with a first editing state comprises:

loading an editing template selected for the editing task to generate the editing task in the first editing state when an execution editing operation creating the editing task is triggered; and recording first editing task information associated with the editing task in the first editing state.

14. The electronic device according to claim 12, wherein the recording first editing task information associated with the editing task in the first editing state comprises:

performing a deep copy of the first editing task information related to the editing task in the first editing state and creating a backup record in a running memory.

15. The electronic device according to claim 13, wherein the recording first editing task information associated with the editing task in the first editing state comprises:

performing a deep copy of the first editing task information related to the editing task in the first editing state and creating a backup record in a running memory.

16. The electronic device according to claim 11, wherein the determining second editing task information associated with a second editing state comprises:

continuing to perform editing processing on the editing task in the first editing state to change the editing task from the first editing state to the second editing state, in response to the editing operation triggered on the editing task in the first editing state; and recording second editing task information associated with the editing task in the second editing state.

17. The electronic device according to claim 16, wherein the recording second editing task information associated with the editing task in the second editing state comprises:

performing a deep copy of the second editing task information related to the editing task in the second editing state and creating a backup record in a running memory.

18. A non-transitory storage medium comprising computer-executable instructions, wherein the computer-executable instructions, when executed by a computer processor, are used for executing a method for editing and processing multimedia material, and the method comprises:

determining first editing task information associated with a first editing state, wherein the first editing state is an editing state where an editing task is initially triggered, the first editing task information is used for describing an editing result generated by a triggered editing operation in the editing state for the editing task, and the editing task is a multimedia material editing task;

determining second editing task information associated with a second editing state, wherein the second editing state is an editing state where editing operation continued to be triggered for the editing task already in the first editing state; and performing draft storage on the second editing state of the editing task when the draft storage is triggered for the editing task in the second editing state, wherein the draft storage for the second editing state of the editing task is determined based on an editing task information difference between the second editing task information and the first editing task information, wherein the performing draft storage on the second editing state of the editing task comprises:

when a draft associated with the editing task has been stored in a local storage device, comparing the second editing task information with the first editing task information to determine an information change result of the second editing task information relative to the first editing task information; and when the information change result indicates that an information change occurs, performing the draft storage on the second editing state of the editing task according to the editing task information difference generated by an information change between the second editing task information and the first editing task information.

* * * * *